Sept. 15, 1953 E. J. THOR 2,651,969
MULTIPURPOSE MICROSCOPE ATTACHMENT
Filed June 14, 1952 2 Sheets-Sheet 1
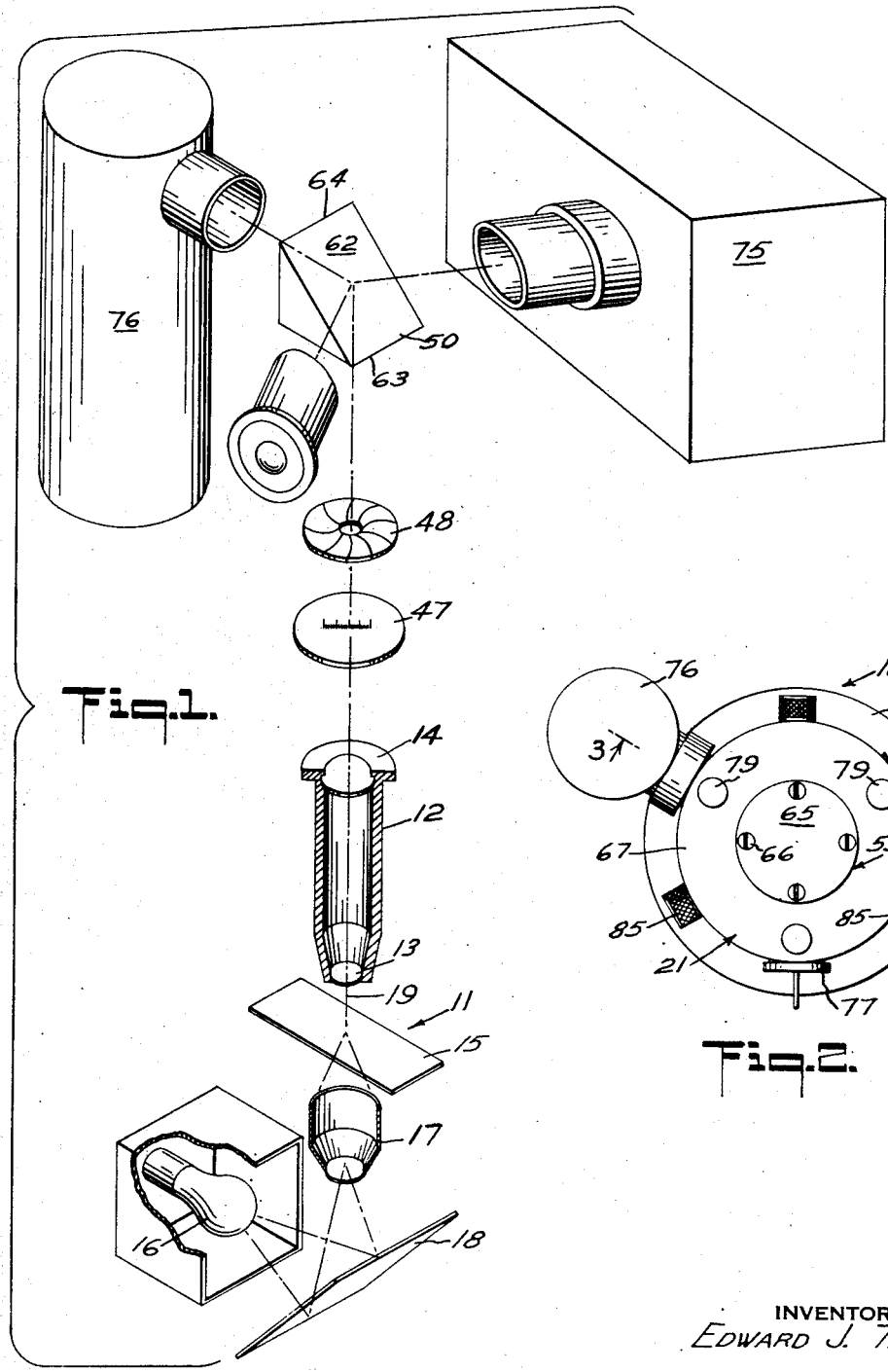
INVENTOR
EDWARD J. THOR
BY
ATTORNEYS

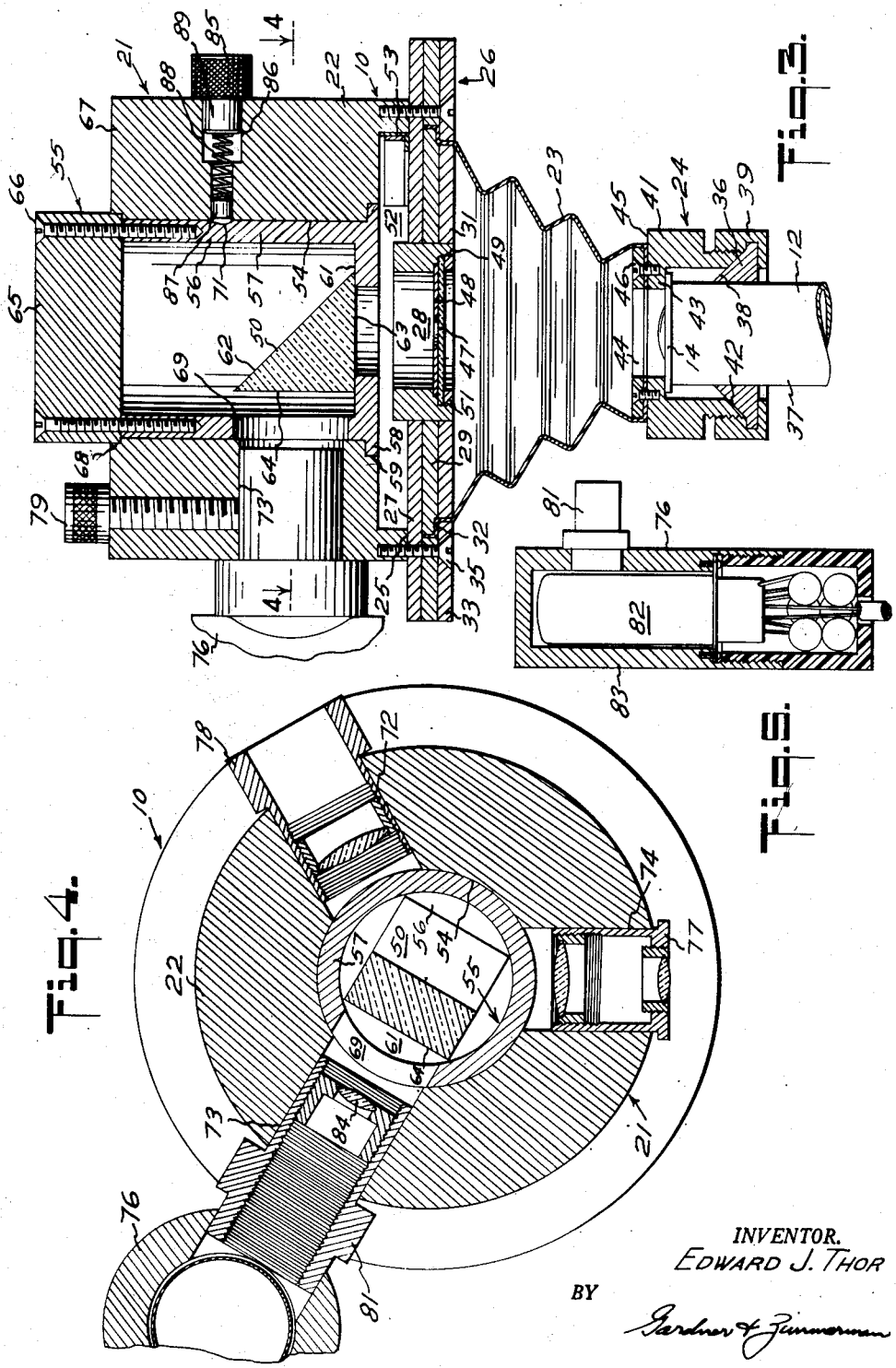

Patented Sept. 15, 1953

2,651,969

UNITED STATES PATENT OFFICE 2,651,969

MULTIPURPOSE MICROSCOPE ATTACHMENT

Edward J. Thor, San Francisco, Calif.

Application June 14, 1952, Serial No. 293,521

8 Claims. (Cl. 88—40)

My invention relates, in general, to the art of microscopy and, more particularly, to an attachment for facilitating the execution of a series of different microscope observations.

Modern microscope technique employs a variety of instruments for recording observations and for supplementing the classical visual methods. For example, it is often necessary to photograph or to make photometric observations on a specimen once a detail of interest has been discovered by visual observation.

Heretofore, the performance of these supplementary operations has been tedious and time consuming as conventional practice requires the attachment and detachment, in turn, of the individual instruments. Frequently the value of some of the observations may be lowered due to long time factors and to difficulties in obtaining accurate and reproducible adjustments of the various instruments.

The multipurpose microscope attachment device of my invention facilitates the rapid execution of such a series of supplementary and visual observations and eliminates the difficulties and disadvantages encountered in conventional practice. Such attachment is adapted to engage the eyepiece portion of a conventional microscope in light excluding relation and includes a ground glass screen positioned on the optical axis of the microscope upon which the observed image appears. Disposed outwardly from the ground glass screen and on the optical axis of the microscope, an indexed rotatable reflector means directs the said image angularly outward from said axis. Provision is made in the device for supporting the required instruments and eyepieces in appropriate positions for interpreting the image reflected by the indexed reflector means. An iris diaphragm disposed between the ground glass screen and the said reflector means is employed to limit the field of observation as required in certain of the operations.

Accordingly, it is an object of my invention to facilitate the execution of a series of microscope observations.

Another object of my invention is to provide a microscope attachment device for facilitating visual and supplementary observation of selected portions of a specimen.

Still another object of my invention is to provide a microscope attachment wherein an indexed rotatable reflector is employed to direct an image into each of a plurality of eyepieces and assorted instruments disposed outwardly from the optical axis of the microscope.

A further object of my invention is to provide a microscope attachment device which includes iris means for limiting the field of observation as required in the operation of instruments associated therewith.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing may be adopted within the scope of the invention as set forth in the claims.

With reference to said drawing:

Figure 1 is a schematic illustration indicating the optical arrangement of elements of a typical microscope system and essential elements of the attachment device of the invention;

Figure 2 is a plan view of the attachment device;

Figure 3 is a vertical cross sectional view taken along the plane 3—3 of Figure 2;

Figure 4 is a transverse cross sectional view taken along the plane 4—4 of Figure 3;

Figure 5 is a vertical cross sectional view of a photometric element suitable for use with the attachment device of the invention.

The microscope attachment 10 of my invention may be employed with any conventional microscope now available. However, for purposes of illustration, reference will be made to the highly simplified microscope system 11 shown in Figure 1 of the drawing. As illustrated therein the microscope barrel 12 including an objective lens 13 and an eye piece portion 14 is arranged in spaced relation with respect to a slide 15 upon which the specimen is mounted. Illumination of the specimen is provided for in the conventional manner by the light source 16, sub-stage condenser 17 and mirror 18. From the standpoint of convenience it is preferred that the optical axis 19 of the microscope system 11 be disposed in a vertical position.

As may best be seen by reference to Figure 3 of the drawing, the multipurpose attachment 10 of my invention is constructed with a closed housing 21 supported by suitable means (not shown) above the microscope. The housing includes an upper annular casing member 22 joined with a conical bellows member 23 extending downwardly therefrom and tapering inwardly to be joined by means of a detachable eyepiece engagement 24 to the eyepiece portion 14 of the microscope, whereby the central axis of the housing is coincident with the optical axis of the microscope.

In detail, a narrow annular surface 25 is provided on the lower end of the casing 22 whereby the bellows 23 may be attached thereto by a bellows attachment means 26 which also serves to support internal elements of the device as will be more fully set forth hereinafter. The attachment means 26 may be conveniently constructed by providing a wide annular ring 27 jointed by the inner marginal edge surface to a tubular member 28, a narrow annular ring 29 similarly joined to said tubular member 28 and abutting against the lower side of the ring 27, and a still narrower annular ring 31 similarly joined to a member 28 and abutting against the lower side of ring 29. Preferably the upper end of the tubular member 28 projects somewhat above the upper surface of plate 27.

Now the upper end portion of the bellows, provided with a corresponding conformation, may be engaged with the outer marginal edge of the ring 31, the lower annular shoulder portion 32 of the ring 29, which portion 32 is disposed outwardly from ring 31, and with the outer marginal edge of the ring 29. Retention of the bellows thereon is effected by fitting an annular ring 33 in close relation with the outer marginal edge of the ring 31. Finally, the assembled attachment means 26 is held in firm engagement with the lower end surface 25 of the casing 22, by means of screws 35 which extend through perforations formed in rings 27, 33 and 34, whereby the upper surface of ring 27 abuts against the casing surface 25.

A bellows eyepiece engagement 24, which is easily detached from the microscope may be provided as shown in Figure 3 wherein a ring 36 is fit closely in contact with the exterior tubular surface 37 of the eyepiece portion 14 of the microscope which ring 36 is provided with a beveled upper surface 38. Preferably, the ring 36 is formed of a stiff, non-rigid, molded plastic material; however, a split metal ring may also be employed. A first collar 39, threaded internally in the upper portion thereof and having a lower inwardly flanged lip fitting beneath the lower end surface of the ring 36 engages the lower threaded end of a second collar 41, whereby a beveled end portion 42, of the collar 41, is urged into forcible engagement with the beveled surface 38 compressing the ring 36 against the tubular eyepiece surface 37. Upper portions of the second collar 41 include an inner flange 43 which abuts against upper terminal portion of the eyepiece 14 in firm relation by virtue of the threaded engagement of collars 39 and 41. Joining of the lower end of the bellows 23 to the engagement 24 is accomplished by clamping a terminal inwardly extending lip portion thereof between a ring 44 and the upper surface 45 of the second collar 41 as by means of screws 46 inserted through perforations formed in ring 44.

Having described the general structure of the housing 21, details of the arrangement of essential functional elements and associated structure of the attachment 10 will now be described.

In order to obtain an appropriate image a transparent plate 47 is disposed above the eyepiece 14 in such a position that the upper graduated ground surface thereof may be brought into the focal plane of the microscope eyepiece 14, as indicated in Figure 1 of the drawing. Also, as indicated therein, an iris diaphragm 48 is disposed above said plate 47 to provide an adequate means for limiting observation to desired portions of the images as required in certain microscope techniques. Advantageously, the plate 47 and diaphragm 48 are mounted in the tubular member 28, of the upper bellows attachment means 26, as by insertion into a lower enlarged threaded bore section 49 of said tubular member, wherein secure retention is effected by means of an externally threaded ring 51, as may best be seen in Figure 3 of the drawing.

It may be noted that the upper end of the tubular member 28 projects upwardly into a relatively enlarged lower bore section 52 of the casing 22, permitting, also, an angular light stop member 53 to be employed to seal the juncture of the annular end surface 25 of the casing and the upper surface of the ring 27. The upper base section 54 of the casing 22 is constructed relatively smaller than the base section 52 and is adapted to receive a rotatable mount assembly 55 employed to position reflector means such as the prism 50 above the iris diaphragm 48 whereby the image from the ground surface of the plate 47 is directed angularly from the said optical axis 19.

In detail, the prism mount assembly 55 includes a cup-like portion 56 having a cylindrical wall 57 fitting in close relation with the walls of bore section 54 and having a circumferential ridge 58 projecting outwardly from the bottom edges thereof to engage a lower terminal recessed portion 59 of the casing bore. The floor portion 61 of the cup-like portion 56 is perforated centrally and the prism 50 is attached to the floor portion 61 in a position directly over this central opening.

Preferably the prism 50 is of the isosceles rectangular type and is mounted with the hypotenuse face plane 62 at a 45° inclination with respect to the optical axis 19. Accordingly the lower face plane 63 of the prism will be oriented horizontally and the other face plane 64 will be vertically disposed, whereby the reflected image will be directed horizontally outward from the optical axis 19, all as indicated in Figure 1 of the drawing. With this arrangement the hypotenuse plane 62 serves as the actual reflecting surface and cylindrical cover plate 65, attached as by means of screws 66 to the upper end portions of the cylindrical wall 57, extends above the upper surface 67 of the casing member 22, whereby the prism mount assembly may be manually rotated. Such cover plate 65 overlaps the cylindrical wall 57 thereby engaging an upper terminal recessed portion 68 of the casing bore wall in a manner appropriate to support the cup-like portion 56 of the prism mount within the casing bore.

To allow emergence of the image reflected by the prism, from the prism mount, the cylindrical wall 57 is provided with a circular opening 69 directly facing the vertical face 64 of the prism, whereby the axis of said opening 69 intersects the optical axis 19 at the point of intersection of said axis with the hypotenuse plane 62 of the prism, as shown in Figure 1 of the drawing. A concave depression 71 is also provided in the outer surface of the cylindrical wall 57, preferably at a diametrically opposed position with respect to the opening 69, which depression is employed in a detent arrangment for including and positioning the prism mount assembly.

To provide for the mounting of the desired instruments, a series of radially spaced circular openings are formed in said casing member 22 which openings may be brought into axial alignment with the opening 69 by rotation of the prism mount 55. The number of such openings required will depend on the number of instruments to be employed. For example, three separate instruments are shown in the drawing, accordingly, three openings 72, 73 and 74, are provided, and are employed to mount a camera 75, a photometric device 76 and a tubular eyepiece 77, respectively.

More particularly, the opening 72 is adapted to receive the tubular lens mount 78 of the camera 75, in axial alignment therewith, retention being effected with a locking screw 79 inserted in a threaded perforation extending from the upper casing surface 67, to the said opening 72.

Similarly, the opening 73 is adapted to receive the tubular lens mount 81 of the photometric device 76 in axial alignment therewith; retention being effected by means of a locking screw 79 as in the case of the camera lens mount 78.

Such photometric device 76 may comprise a conventional photosensitive (photomultiplier) tube assembly illustrated generally in Figure 5. Essentially such device 76 includes a photosensitive tube 82 mounted in a closed cylindrical casing 83 with associated electrical components, whereby light entering the tubular lens mount 81, which latter is mounted in the wall of the casing 83, may impinge upon the photosensitive surface of the tube 82. A lens 84 may be mounted in the lens mount 81 to focus the image reflected by the prism and upon the photosensitive surface of the tube 82. External electrical components (not shown) are employed with the photosensitive tube 82 assembly in the conventional manner.

Similarly the tubular eyepiece 77 is received, in axial alignment, by the opening 74 and retained therein by a locking screw 79, thereby providing for visual observation of the image. Such eyepiece 77 may be of the conventional type indicated in Figure 4, or any other suitable eyepiece may likewise be employed.

With the arrangement indicated in the foregoing, the prism mount assembly 55 may be rotated whereby the axis of each of said openings 72, 73 and 74 may be brought into alignment with the axis of the opening 69. Accordingly, it may be seen that the axis of such openings 72, 73 and 74, as well as of opening 69, will intersect the optical axis 19 at the point of intersection thereof with the hypotenuse plane 62, of the prism. Moreover, it will be noted that the single opening 69 formed in the cylindrical wall 57 of the prism mount assembly 55 allows only one instrument at a time to be operative. Extraneous light which otherwise might enter the casing is thereby excluded.

To effect rapid and positive alignment of each opening 72, 73 and 74 with the opening 69 a detent arrangement 85 is provided, preferably, at each location diametrically opposed from said openings 72, 73 and 74, in the wall of the annular casing 22, whereby the said concave depression 71 may be engaged therewith. More particularly, there are provided circular bore perforations 86 extending through the wall of the casing 22 at the above-indicated locations, with the inner portion of each bore being somewhat constricted to receive a pin 87 having a rounded end adapted to fit closely within the said depression 71. Each pin 87 is urged into said close fit by a compression spring 88 disposed in the perforation 86 and retained therein by a plug 89 which engages the sides of said opening 86. Accordingly, the pins 87 will click successively into the depression 71 as the mount assembly is rotated and positive alignment of the said openings will be effected.

The method of operating the device consists in placing a specimen on the stick 15, focusing the image on the graduated plate 47 while observing the images formed thereon through the eyepiece 77. Mere rotation of the prism mount assembly 55 will then cause either the camera or the photometric device to become operative.

The optical portions of the entire system including the attachment may be of optical glass when ordinary light is employed to illuminate the specimen. However, if ultra violet radiation is to be employed all of the light-transmissive elements must be made of a suitable material such as quartz. Moreover, the light-reflecting hypotenuse surface 62 of the prism should be provided with a metal coating as of "sputtered" aluminum to assure efficient reflection.

I claim:

1. A multipurpose microscope attachment of the character described comprising a supported light excluding housing having an upper casing member attached at the lower portion thereof to an extensible bellows the lower portion of which may engage the eyepiece portion of a microscope, a ground surface transparent plate disposed above and positionable in the focal plane of said eyepiece, an iris diaphragm disposed above and in alignment with said transparent plate, rotatable reflector means disposed within said casing member above said diaphragm on the optical axis of the microscope and at an angular inclination therewith, means provided in said casing member for positioning a plurality of peripherally spaced instruments so as to intercept an image reflected by said reflector means from said ground surface transparent plate, and indexing means provided in said casing for positioning the rotatable reflector means.

2. In a multipurpose microscope attachment of the character described, in combination, a supportable closed housing formed of an upper annular casing portion, having a series of radially aligned openings formed in the wall thereof, and a bellows portion attached to the lower end of said casing which bellows is adapted at the lower end for engagement of a microscope eyepiece in axial alignment with said casing; a graduated ground glass plate disposed within said housing and vertically intersected by the axis of the casing; an iris diaphragm disposed above the graduated plate within the housing; a rotatable prism mount assembly disposed within said casing portion and having a peripheral opening which may be brought successively into corresponding alignment with each of the openings in said casing; a reflector prism supported within said mount assembly with the reflector plane thereof intersected at a common point by the axis of said openings in the casing and by the axis of said annular casing, whereby an image cast upon said graduated plate passes through the iris diaphragm and is reflected through the opening in the prism mount and said corresponding opening in the casing.

3. In a device of the character described, in combination, a supportable housing formed of an upper annular casing portion, provided in the walls thereof with a series of radially aligned openings each adapted to receive an optical instrument, and a bellows portion attached by means of an annular plate to the bottom end of said casing which bellows is adapted at the lower end to engage eyepiece portions of a microscope, whereby the casing, annular plate and eyepiece are axially aligned; a graduated ground glass plate supported within the central opening of the annular plate; an iris diaphragm supported above the glass plate within the central opening of the annular plate; a rotatable prism mount having a tubular wall portion engaging the inner bore walls of said casing portion said tubular wall having an opening which may successively be caused to correspond with said casing openings; and a reflector prism supported axially within the tubular portion of the prism mount, whereby an image cast on the graduated plate may be reflected through the opening in said tubular mount wall by said prism.

4. In a device of the character described, in combination, a supportable housing formed of an upper annular casing provided with a series of radially aligned openings in the walls thereof with each opening adapted to receive and support an optical instrument, and of a bellows attached to an annular plate affixed to the lower end of the casing and provided at the lower end thereof with means for engaging a microscope eyepiece, whereby the casing, annular plate and eyepiece are axially aligned; a graduated ground glass plate supported within the central opening of the annular plate; an iris diaphragm disposed within the central opening of the annular plate; a rotatable prism mount having a cup-like portion the bottom portion of which is centrally perforated and peripheral tubular wall portions of which engage the annular bore walls of the casing and which tubular wall portions are perforated at a location corresponding to the casing openings; and a rectangular reflector prism carried by the bottom of the cup-like mount portion with the hypotenuse plane intersected at a common point by the axis of said casing and axis of the opening in the tubular wall portion of the prism mount, whereby an image appearing on said graduated plate is reflected through said opening in the tubular wall.

5. In a device of the character described, in combination, a supportable housing formed of an upper annular casing provided with a series of radially aligned openings in the walls thereof with each opening adapted to receive and support an optical instrument, and of a bellows attached to an annular plate affixed to the lower end of the casing and provided at the lower end thereof with means for engaging a microscope eyepiece, whereby the casing, annular plate and eyepiece are axially aligned; a graduated ground glass plate supported within the central opening of the annular plate; an iris diaphragm disposed within the central opening of the annular plate; a rotatable prism mount having a cup-like portion the bottom portion of which is centrally perforated and peripheral tubular wall portions of which engage the annular bore walls of the casing and which tubular wall portions are perforated at a location corresponding to the casing openings; and detent means associated with said casing and serving to positively position the opening in the prism mount tubular wall portion with each of the openings in the casing.

6. In a device of the character described, in combination, a supportable housing formed of an upper annular casing portion, provided in the walls thereof with a series of radially aligned openings each adapted to receive an optical instrument, and a bellows portion attached by means of an annular plate to the bottom end of said casing which bellows is adapted at the lower end to engage eyepiece portions of a microscope, whereby the casing, annular plate and eyepiece are axially aligned; a graduated ground glass plate supported within the central opening of the annular plate; an iris diaphragm supported above the glass plate within the central opening of the annular plate; a rotatable prism mount having a tubular wall portion engaging the inner bore walls of said casing portion said tubular wall having an opening which may successively be caused to correspond with said casing openings, a reflector prism supported axially within the tubular portion of the prism mount, whereby an image cast on the graduated plate may be reflected through the opening in said tubular mount wall by said prism; and detent means associated with said casing portion and serving to positively position the opening in the prism mount with the casing openings successively during rotation of the prism mount.

7. In a device of the character described, in combination, a supportable housing formed of an upper annular casing provided with a plurality of radially aligned openings each adapted to receive a lens mount portion of an optical instrument, of a bellows attached to an annular plate affixed to the lower end of said casing and with attachment means including an externally threaded collar attached to the lower bellows portion, a ring member engageable with tubular portions of a microscope eyepiece, and a collar having a flange portion fitting beneath the lower end of said washer and an upper internally threaded sleeve portion engaging the said externally threaded collar, whereby the casing, annular plate and eyepiece are axially aligned; a graduated ground glass plate supported within the central opening of the annular plate; an iris diaphragm disposed within the central opening of the annular plate; a rotatable prism mount having a cup-like portion the bottom portion of which is centrally perforated and peripheral tubular wall portions of which engage the annular bore walls of the casing and which tubular wall portions are perforated at a location corresponding to the casing openings; and a rectangular reflector prism carried by the bottom of the cup-like mount portion with the hypotenuse plane intersected at a common point by the axis of said casing and axis of the opening in the tubular wall portion of the prism mount, whereby an image appearing on said graduated plate is reflected through said opening in the tubular wall.

8. In a device of the character described, in combination, a supportable housing formed of an upper annular casing provided with a plurality of radially aligned openings each adapted to receive a lens mount portion of an optical instrument, of a bellows attached to an annular plate affixed to the lower end of said casing and with attachment means including an externally threaded collar attached to the lower bellows portion, a ring member engageable with tubular portions of a microscope eyepiece, and a collar having a flange portion fitting beneath the lower end of said washer and an upper internally threaded sleeve portion engaging the said externally threaded collar, whereby the casing, annular plate and eyepiece are axially aligned; a graduated ground glass plate supported within the central opening of the annular plate; an iris diaphragm disposed within the central opening of the annular plate; a rotatable prism mount having a cup-like portion the bottom portion of which is centrally perforated and peripheral tubular wall portions of which engage the annular bore walls of the casing and which tubular wall portions are perforated at a location corresponding to the casing openings; and detent means associated with said casing and serving to positively position the opening in the prism mount tubular wall portion with each of the openings in the casing.

EDWARD J. THOR.

No references cited.